United States Patent
Zhou et al.

(10) Patent No.: US 12,232,096 B2
(45) Date of Patent: *Feb. 18, 2025

(54) ACCESS RESOURCE DETERMINATION METHOD AND DEVICE, STORAGE MEDIUM AND TERMINAL

(71) Applicant: SPREADTRUM COMMUNICATIONS (SHANGHAI) CO., LTD., Shanghai (CN)

(72) Inventors: Huayu Zhou, Shanghai (CN); Zhengang Pan, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 355 days.

This patent is subject to a terminal disclaimer.

(21) Appl. No.: 17/635,955

(22) PCT Filed: Aug. 10, 2020

(86) PCT No.: PCT/CN2020/108109
§ 371 (c)(1),
(2) Date: Feb. 16, 2022

(87) PCT Pub. No.: WO2021/031897
PCT Pub. Date: Feb. 25, 2021

(65) Prior Publication Data
US 2022/0330242 A1 Oct. 13, 2022

(30) Foreign Application Priority Data
Aug. 16, 2019 (CN) .......................... 201910762910.6

(51) Int. Cl.
*H04W 72/04* (2023.01)
*H04W 48/10* (2009.01)
(Continued)

(52) U.S. Cl.
CPC ....... *H04W 72/0453* (2013.01); *H04W 48/10* (2013.01); *H04W 72/23* (2023.01)

(58) Field of Classification Search
None
See application file for complete search history.

(56) References Cited

U.S. PATENT DOCUMENTS 10,805,872 B2 * 10/2020 Yi .......................... H04L 5/0035
10,856,320 B2 * 12/2020 Jung .................... H04L 5/0091
(Continued)

FOREIGN PATENT DOCUMENTS

| CN | 108199819 A | 6/2018 |
|---|---|---|
| CN | 110475361 A | 11/2019 |

(Continued)

OTHER PUBLICATIONS

JPO Notice of Reasons for Refusal for corresponding JP Application No. 2022-510169; Date of Mailing, Jun. 13, 2023.
(Continued)

*Primary Examiner* — Eunsook Choi
(74) *Attorney, Agent, or Firm* — CANTOR COLBURN LLP

(57) ABSTRACT

An access resource determination method and device, a storage medium and a terminal is provided. The method includes: determining a frequency domain position of a narrowband Control Resource SET0 (CORESET0) and/or a frequency domain position of a narrowband initial active downlink Bandwidth Part (BWP); and/or determining a narrowband System Information Block1 (SIB1).

12 Claims, 1 Drawing Sheet

--- the UE determines a frequency domain position of a narrowband CORESET0 and/or a frequency domain position of a narrowband initial active downlink Bandwidth Part (BWP); and/or determines a narrowband SIB1. — S101 the narrowband UE receives a CORESET0 and/or the narrowband initial active downlink BWP at the frequency domain position, and/or receives the narrowband SIB1. — S102

(51) Int. Cl.
*H04W 72/0453* (2023.01)
*H04W 72/23* (2023.01)

(56) References Cited

U.S. PATENT DOCUMENTS

| | | | | |
|---|---|---|---|---|
| 11,218,967 | B2* | 1/2022 | Sun | H04W 68/00 |
| 11,290,245 | B2* | 3/2022 | Pelletier | H04L 1/0026 |
| 11,324,030 | B2* | 5/2022 | Ly | H04W 72/23 |
| 11,438,117 | B2* | 9/2022 | Seo | H04W 72/23 |
| 2017/0311232 | A1* | 10/2017 | Yi | H04W 72/23 |
| 2018/0234219 | A1* | 8/2018 | Sridharan | H04L 5/023 |
| 2018/0241535 | A1* | 8/2018 | Chen | H04W 72/30 |
| 2018/0332505 | A1 | 11/2018 | Kim et al. | |
| 2019/0007124 | A1 | 1/2019 | Seo et al. | |
| 2019/0082431 | A1* | 3/2019 | Yi | H04W 72/0446 |
| 2019/0159226 | A1 | 5/2019 | Ly et al. | |
| 2019/0223145 | A1* | 7/2019 | Jung | H04W 48/12 |
| 2020/0367242 | A1* | 11/2020 | Moon | H04L 1/00 |
| 2021/0084623 | A1 | 3/2021 | Zhang et al. | |
| 2021/0307041 | A1* | 9/2021 | Wei | H04L 5/0053 |

FOREIGN PATENT DOCUMENTS

| | | |
|---|---|---|
| CN | 110505642 A | 11/2019 |
| WO | 2019099174 A1 | 5/2019 |

OTHER PUBLICATIONS

Samsung, "Coexistence between NR and LTE NB-IoT", 3GPP TSG RAN WG1 Meeting #98, R1-1908449, Aug. 26-30, 2019, 6 pages.
Sierra Wireless, "Narrow and Wideband Compatibility of Broadcast Control Information", 3GPP TSG RAN WG2 Meeting #96, R2-168594, Nov. 14-18, 2016, 4 pages.
Spreadtrum Communications, "Association between SS blocks and the corresponding RMSI(s) in wideband operation", 3GPP TSG RAN WG1 Meeting 91, R1-1719827, Nov. 27-Dec. 1, 2017, 4 pages.
Spreadtrum Communications, "Remaining issues of remaining minimum system information", 3GPP TSG RAN WG1 Meeting AH 1801, R1-1800275, Jan. 22-26, 2018, 3 pages.
International Search Report for International Application No. PCT/CN2020/108109; Date of Mailing, Oct. 22, 2020.
LG Electronics, "RMSI delivery and CORESET configuration"; 3GPP TSG RAN WG1 Meeting #93; R1-1806602; May 21-25, 2018; 17 pages.
MediaTek Inc., "Summary of Bandwidth Part Remaining Issues"; 3GPP TSG RAN WG1 Meeting #94; R1-1809849; Aug. 20-Aug. 24, 2018; 23 pages.
CNIPA Second Office Action for corresponding Application No. CN201910762910.6, dated Jan. 5, 2022.
Spreadtrum Communications, "Remaining issues on PRB bundling for DL", 3GPP TSG RAN WG1 Meeting #94bis, R1-1810998, Oct. 8-12, 2018, 2 pages.
CATT, "On Remaining Issues on RMSI", 3GPP TSG RAN WG1 Meeting AH 1801, R1-1800229, Jan. 22-26, 2018, 36 pages.
EPO Extended European Search Report for corresponding EP Application No. 20854660.6; Dated: Sep. 12, 2022.
KR Office Action for corresponding KR Application No. 10-2022-7008785; Issued Sep. 23, 2024; 12 pages.
LENOVO "Discussion on NB-IoT multi-carrier operation"; 3GPP TSG RAN WG1 Meeting #84; R1-161008; St. Julian's, Malta, Feb. 15-19, 2016; 4 pages.

* cited by examiner

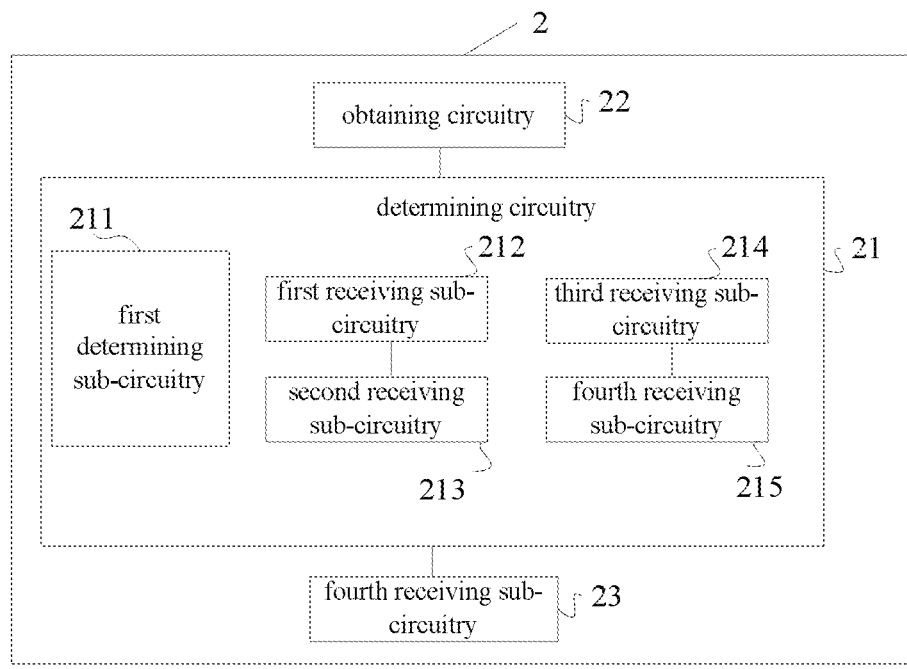

ACCESS RESOURCE DETERMINATION METHOD AND DEVICE, STORAGE MEDIUM AND TERMINAL

CROSS-REFERENCE TO RELATED APPLICATIONS

This is the U.S. national stage of application No. PCT/CN2020/108109, filed on Aug. 10, 2020. Priority under 35 U.S.C. § 119(a) and 35 U.S.C. § 365(b) is claimed from Chinese Application No. 201910762910.6, filed Aug. 16, 2019, the disclosure of which is also incorporated herein by reference.

TECHNICAL FIELD

The present disclosure generally relates to wireless communication technology field, and more particularly, to an access resource determination method and device, storage medium and terminal.

BACKGROUND

The 3rd Generation Partnership Project (3GPP) standards organization is working on a New Radio (NR) system for the Fifth-Generation mobile communications (5G). A NR protocol in the future can support a narrowband User Equipment (UE), or, a UE with a bandwidth less than 100 MHz. This kind of UE can be used for a Machine Type Communication (MTC, or Internet of Thing, IoT for short).

Generally speaking, a UE needs to support at least a maximum bandwidth of a Control Resource SET0 (CORESET0) and/or a maximum bandwidth of an initial active downlink Bandwidth Part (BWP). In an initial access process, the UE obtains a bandwidth of the CORESET0 through information carried by a PBCH. In general, the CORESET0 is a control resource set for carrying a Type0-PDCCH (i.e., RMSI PDCCH or SIB1 PDCCH). By default, the bandwidth of the CORESET0 is also a bandwidth of the initial active downlink BWP. In general, a frequency domain resource of a Physical Downlink Shared Channel (PDSCH) for carrying a System Information Block1 (SIB1) is limited in the initial active downlink BWP. After obtaining the SIB1, the initial active downlink BWP can be further expanded for great flexibility. Specifically, the extended bandwidth of the initial active downlink BWP may be transmitted to the UE through a signaling in the SIB1.

However, for a narrowband UE, a maximum bandwidth of the CORESET0 and/or a maximum bandwidth of the initial active downlink BWP may exceed a bandwidth supported by the narrowband UE. In this case, there is a need for a method for the narrowband UE obtaining and configuring a new narrowband CORESET0 and/or a narrowband initial activation downlink BWP.

SUMMARY

Embodiments of the present disclosure provide a method for determining an access resource.

In an embodiment of the present disclosure, a method for determining an access resource is provided, the method includes: determining a frequency domain position of a narrowband Control Resource SET0 (CORESET0) and/or a frequency domain position of a narrowband initial active downlink Bandwidth Part (BWP); and/or determining a narrowband System Information Block1 (SIB1).

In an embodiment of the present disclosure, a device for determining an access resource is provided, the device includes: a determining circuitry, adapted to determine a frequency domain position of a narrowband Control Resource SET0 (CORESET0) and/or a frequency domain position of a narrowband initial active downlink Bandwidth Part (BWP); and/or, determine a narrowband System Information Block1 (SIB1).

In an embodiment of the present disclosure, a non-transitory storage medium is provided, the non-transitory storage medium storing one or more programs, the one or more programs comprising computer instructions, which, when executed by a processor, cause the processor to: determine a frequency domain position of a narrowband Control Resource SET0 (CORESET0) and/or a frequency domain position of a narrowband initial active downlink Bandwidth Part (BWP); and/or determine a narrowband System Information Block1 (SIB1).

BRIEF DESCRIPTION OF THE DRAWINGS

FIG. 1 schematically illustrates a flowchart of a method for determining an access resource according to an embodiment of the present disclosure; and FIG. 2 schematically illustrates a structural diagram of a device for determining an access resource according to an embodiment of the present disclosure.

DETAILED DESCRIPTION

As mentioned in background, in the existing technology, there is a need for a solution for obtaining and configuring a narrowband CORESET0 and/or a narrowband initial active downlink BWP.

Specifically, in the Release 15 NR system, synchronization signals and broadcast channel signals are transmitted as Synchronization Signal and Physical Broadcast Channel Blocks (SS/PBCH block). Further the 5G system also introduces functions such as beam sweeping. Each SS/PBCH block can be regarded as a resource corresponding to one beam in the beam sweeping. Wherein, a SS/PBCH block may include a Primary Synchronization Signal (PSS), a Secondary Synchronization Signal (SSS) and a Physical Broadcast Channel (PBCH) signal. A plurality of SS/PBCH blocks may form a synchronization signal burst. The synchronization signal burst can be regarded as a relatively concentrated resource containing a plurality of beams. And a plurality of synchronization signal burst may form a synchronization signal burst set. The SS/PBCH blocks are transmitted on different synchronization signal bursts repeatedly to complete the beam sweeping process. Through the training of the beam sweeping, a UE can determine which beam receives a strongest signal.

For example, assuming that time domain positions of L numbers of SS/PBCH blocks within a 5 millisecond (ms) window are fixed. That is, the transmission occasion of SS/PBCH blocks within the 5 ms window are fixed, and indices are also fixed. Wherein, the indices of the L numbers of SS/PBCH blocks are put in a successive order in the time domain positions, from 0 to (L−1), and L is a positive integer.

Further, a Remaining Minimum System Information (RMSI) is also called as SIB1. RSMI in the Release 15 NR is similar to a SIB1 in the LTE, which includes a main system information except a Master Information Block (MIB). The RMSI may also be referred to as the SIB1. The RMSI is carried by a Physical Downlink Shared Channel (PDSCH), and the PDSCH is scheduled through a Physical Downlink Control Channel (PDCCH). A PDSCH carrying a RMSI is generally referred to as a RMSI PDSCH, and a PDCCH for scheduling the RMSI PDSCH is generally referred to as a RMSI PDCCH.

In general, a search space set may include properties such as monitoring occasions and a search space type of the PDCCH. The search space set is generally associated to a Control Resource Set (CORESET), and the CORESET may include properties such as a frequency domain resource and a duration of the PDCCH.

A search space set where a RMSI PDCCH (may also be called a SIB1 PDCCH or a Type0-PDCCH) is located is generally be called a Type0-PDCCH search space set or a Type0-PDCCH common search space set, and is configured by a MIB or is configured by a Radio Resource Control (RRC) in switching and the like. In general, an Identity/Index (ID) corresponding to a Type0-PDCCH search space set is 0, therefore, the Type0-PDCCH search space set is called as a search space 0 (or a search space set 0), and a CORESET associated to the search space 0 is called a CORESET0. In addition to the search space set of the RMSI PDCCH, other common search spaces or common search spaces sets can be determined as the same as the search space set 0 by default, such as a search space set of an OSI PDCCH (Type0A-PDCCH search space set), a search space set of a Random Access Response (RAR) PDCCH (Type1-PDCCH search space set), a search space set of a paging PDCCH (Type2-PDCCH search space set), and so on. In general, the above-mentioned common search spaces or common search spaces sets can be reconfigured.

A monitoring occasion of a RMSI PDCCH is associated with a SS/PBCH block. A UE may obtain the association based on a monitoring occasion table of the RMSI PDCCH. During an initial access process, when the UE finds a certain SS/PBCH block, the UE may determine a time domain position of a RMSI PDCCH associated with the SS/PBCH block (a starting symbol index or a first symbol index) based on a row index of the table indicated by a PBCH, detect the RMSI PDCCH, and receive and decode the RMSI PDSCH based on the RMSI PDCCH scheduling.

In the Release 15 NR, a UE may decode a RMSI PDCCH to obtain a plurality of bits allocated by a time domain resource, and look up in a predefined table based on the bits to obtain a starting symbol index (or a number) and a symbol length (or a duration) of the RMSI PDSCH.

In the Release 15 NR, during an initial access process, the UE may assume that a RMSI PDSCH does not perform a rate matching on a SS/PBCH blocks. The RMSI may indicate whether the SS/PBCH block is transmitted or not. The UE may perform a rate matching on the SS/PBCH block indicated by the RMSI after obtaining the RMSI.

A UE may need to obtain a timing information through a SS/PBCH block. The timing information which may also be referred to as a frame timing information or a half-frame timing information is generally used for indicating a timing of a frame or a half-frame corresponding to a detected synchronization signal. After obtaining the frame timing information, the UE may obtain a complete timing information of a cell corresponding to the SS/PBCH block through a System Frame Number (SFN). After obtaining the half-frame timing information, the UE may obtain the complete timing information of the cell corresponding to the SS/PBCH block through a half-frame indication (the first half-frame or the last half-frame) and the SFN.

In general, a UE may obtain a timing information of 10 ms by obtaining a SS/PBCH block index. In a licensed spectrum, the SS/PBCH block index is related to L numbers of candidate positions of the SS/PBCH blocks, and L is a positive integer. When L=4, the lower 2 numbers of bits (2 LSBs) of the SS/PBCH block index are carried in a PBCH-DMRS (PBCH demodulation reference signal); when L>4, the lower 3 numbers of bits (3 LSBs) of the SS/PBCH block index are carried in the PBCH-DMRS; and when L=64, the upper 3 numbers of bits (3 MSBs) of the SS/PBCH block index are carried in a PBCH payload or a MIB.

In the Release 15 NR, for a given UE, a paging occasion corresponding to the UE consists of a plurality of paging PDCCH monitoring occasions. In one paging occasion, a paging PDCCH may be transmitted by the beam sweeping like a SS/PBCH block. In one paging occasion, the paging PDCCH monitoring occasions correspond to the SS/PBCH blocks one by one. That is, in one paging occasion, a K-th paging PDCCH monitoring occasion corresponds to a K-th SS/PBCH block.

In an enhanced Machine-Type Communication (eMTC) of the Release13LTE, an eMTC UE may be a narrowband UE, and a bandwidth of the eMTC UE is about 1 MHz, which may cover 6 numbers of PRBs. Therefore, the eMTC UE may detect the PSS/SSS/PBCH of the LTE during the initial access. And the eMTC UE may decode the MIB of the LTE through the MIB carried in the PBCH. In addition, the MIB of the LTE has 10 numbers of Spare bits, and a part of these Spare bits may be used for carrying an information of a SIB1 (SIB1-BR, different from a LTE SIB1) for scheduling an eMTC. By default, a frequency domain resource of a PDSCH carrying the eMTC SIB1 is also within 6 numbers of PRB, so the eMTC UE may also receive the PDSCH carrying the eMTC SIB1. Therefore, after the eMTC UE decodes the MIB of the LTE, the eMTC UE may obtain the eMTC SIB1 information therein, and then access the network.

In the Release 15 NR, generally, a UE may support a bandwidth of 100 MHz. During an initial access process, the UE may detect the PSS/SSS/PBCH in the SS/PBCH block blindly, and obtain the MIB and time index information carried in the PBCH. The UE may obtain a configuration of a CORESET (may be called CORESET0) and a search space set (may be called search space set 0) to which the PDCCH for scheduling a SIB1 (or RMSI) belongs through the information in the MIB, and further, the UE may monitor and schedule the Type0-PDCCH of the PDSCH for carrying the SIB1, and decode the SIB1. Since the bandwidth of the CORESET0 is set through a table in the PBCH, the maximum bandwidth of CORESET0 is implicitly defined in a protocol. Further, the protocol stipulates that a frequency domain resource of the PDSCH for carrying the SIB1 is within the bandwidth of CORESET0(PRB), therefore, the maximum bandwidth of the PDSCH for carrying the SIB1 is also implicitly defined in the protocol.

Currently, for a narrowband UE, it is necessary to define a narrowband CORESET0 and/or a narrowband initial active downlink BWP (that is, a frequency range of a PDSCH carrying a narrowband SIB1), and/or a narrowband SIB1 (or a narrowband RMSI), because a CORESET0 or an initial active downlink BWP or a SIB1 (RMSI) may not be suitable for the narrowband UE to receive. Generally speaking, in an initial access process, a bandwidth of the narrowband CORESET0 is defaulted to the bandwidth of the narrowband initial activated downlink BWP. After obtaining an additional information, the bandwidth of the narrowband initial activated downlink BWP can be extended. There is a need for a solution on how the narrowband UE obtains and configures the narrowband CORESET0 (or a CORESET of Type0-PDCCH common search space set) and the narrowband initial activated downlink BWP, and there is also a need for a solution on how the narrowband UE obtains and configures the narrowband initial activated downlink BWP.

In embodiments of the present disclosure, a method for determining an access resource is provided, including: determining a frequency domain position of a narrowband CORESET0 and/or a frequency domain position of a narrowband initial active downlink BWP; and/or determining a narrowband SIB1. Generally speaking, a bandwidth of the narrowband CORESET0 is less than or equal to a bandwidth of a CORESET0; a bandwidth of a narrowband PBCH is less than or equal to a bandwidth of a PBCH. According to embodiments of the present disclosure, an access resource of a narrowband UE can be determined by determining a frequency domain position of the narrowband PBCH, a frequency domain position of the narrowband CORESET0, and a frequency domain position of the narrowband initial active downlink BWP, thus the narrowband UE can obtain and configure a maximum bandwidth of the narrowband CORESET0, the PDSCH carrying a SIB1 and the narrowband initial active downlink BWP.

In order to clarify the object, characteristic and advantages of embodiments of the present disclosure, the embodiments of present disclosure will be described clearly in detail in conjunction with accompanying drawings.

Embodiments of the present disclosure are applicable to 5G, 4G and 3G communication systems, and various communication systems evolved subsequently.

The embodiments of the present disclosure are also applicable to different network architectures, including but not limited to relay network architecture, dual link network architecture, and Vehicle-to-Everything communication architecture.

The "plurality" in the embodiments of the present disclosure refers to two or more. It can be understood that, in various embodiments of the present disclosure, the sequence numbers of each process as shown in the accompanying drawings do not limit an execution order, and the execution sequence of each process should be determined by its function and internal logic, which should not constitute any limitation on the implementation process of the embodiments of the present disclosure.

It should be understood that the term "and/or" in the present disclosure is merely an association relationship describing associated objects, indicating that there can be three types of relationships, for example, A and/or B can represent "A exists only, both A and B exist, and B exists only. In addition, the character "/" in the present disclosure represents that the former and latter associated objects have an "or" relationship.

The "first", "second" in the embodiments of the present disclosure are only used for illustrating and distinguishing description objects, and have no sequence limitation, nor do they represent a special limitation on the number of devices in the embodiments of the present invention, and do not constitute any limitation to the embodiments of the present disclosure.

The "connection" in the embodiments of the present disclosure refers to various connection ways including direct connection or indirect connection to realize communication between devices, which should not put limitation on the embodiments of the present disclosure.

Hereinafter, various embodiments of the present disclosure are described in detail with reference to accompanying drawings. Flow charts and block diagrams in the drawings illustrate possible implementation architecture, functions and operations of the methods and systems provided in various embodiments of the present disclosure. It should be noted that each block in the flow charts or the block diagrams may represent a module, a program segment, or a portion of a code, which may include one or more executable instructions for implementing logical functions defined in the various embodiments. It should also be noted that, in some alternative embodiments, functions illustrated in the block may occur in a different order from an order illustrated in the drawings. For example, two blocks shown in succession may actually be performed substantially in parallel, or in a reverse order, which depends on functions involved. It should also be noted that each block in the flow charts and/or the block diagrams, and a combination of the blocks in the flow charts and/or the block diagrams can be implemented using a dedicated hardware-based system that performs specified functions or operations, or using a combination of dedicated hardware and computer instructions. It should also be noted that sequence numbers of steps in the flow charts do not put limitation on an order of the steps.

FIG. 1 schematically illustrates a flowchart of a method for determining an access resource, the method may be applied to a UE side, and may only include S101, or may include S101 and S102.

In S101, the UE determines a frequency domain position of a narrowband CORESET0 and/or a frequency domain position of a narrowband initial active downlink Bandwidth Part (BWP); and/or determines a narrowband SIB1.

Generally speaking, a bandwidth of a narrowband CORESET0 is less than or equal to a bandwidth of a CORESET0; a bandwidth of a narrowband PBCH is less than or equal to a bandwidth of a PBCH.

More specifically, in S101, in one embodiment, the narrowband UE may reuse a SS/PBCH block of the Release 15. The narrowband CORESET0 may have a preset association relationship with an access resource of the narrowband UE. In a specific implementation, the preset association relationship may include: a bandwidth of the narrowband CORESET0 and/or a bandwidth of the narrowband initial active downlink BWP is a preset value. Wherein, the preset value is associated with a band. In a specific implementation, the preset association relationship may include: a lowest PRB of the narrowband CORESET0 is equal to a lowest PRB of a CORESET0; and/or, a lowest PRB of the narrowband initial active downlink BWP is equal to the lowest PRB of the CORESET0. Wherein, the preset value is associated with the band. Based on the preset association relationship, the narrowband UE may determine the frequency domain position of the narrowband CORESET0, and/or the frequency domain position of the narrowband initial active downlink BWP that the narrowband UE can use.

Further, those skilled in the art should understand that usually a frequency domain resource of the narrowband initial active downlink BWP of the narrowband UE is equal to a frequency domain resource of the narrowband CORESET0 by default. Therefore, after determining the narrowband initial active downlink BWP, the narrowband UE can also obtain the frequency domain resource of the narrowband CORESET0.

In some embodiment, a bandwidth of the narrowband CORESET0 may be a preset value; and/or, a bandwidth of the narrowband initial active downlink BWP may be a preset value. The preset value is associated with a band accessed by the narrowband UE.

In another embodiment, the narrowband UE may reuse a SS/PBCH block of the Release 15. The narrowband CORESET0 may have a preset association relationship with an access resource of the narrowband UE. In a specific implementation, the preset association relationship may include: an offset between the lowest PRB of the narrowband CORESET0 and a lowest PRB of a CORESET0 or a SS/PBCH block is a preset value; and/or, an offset between the lowest PRB of the narrowband initial active downlink BWP and the lowest PRB of the CORESET0 is a preset value. Based on the preset association relationship and the offset, the narrowband UE may determine the frequency domain position of the narrowband CORESET0, and/or the frequency domain position of the narrowband initial active downlink BWP, and/or the frequency domain resource of the PDSCH carrying the SIB1. In the embodiment of the present disclosure, the lowest PRB of the SS/PBCH block may be a lowest PRB that overlaps with the lowest PRB of the SS/PBCH block in a Common RB. It should be noted that, sometimes, a real lowest subcarrier of the SS/PBCH block may have a subcarrier level offset from a lowest subcarrier of the PRB. In the present disclosure, a frequency domain offset between any frequency domain resource (such as the CORESET0, the narrowband CORESET0, the initial active downlink BWP, etc.) and the SS/PBCH block may refer to an offset between the lowest PRB of the frequency domain resource and a lowest PRB that overlaps with the lowest PRB of the SS/PBCH block in the Common RB.

For example, a bandwidth of the offset is greater than or equal to a bandwidth of the narrowband CORESET0; and/or, the bandwidth of the offset is greater than or equal to a bandwidth of the narrowband initial active downlink BWP.

For another example, a number of PRBs included in the offset is greater than or equal to a number of PRBs included in the narrowband CORESET0; and/or, the number of PRBs included in the offset is greater than or equal to a number of PRBs included in the narrowband initial active downlink BWP.

Further, the narrowband UE may determine the lowest PRB of the narrowband CORESET0 based on the offset between the narrowband CORESET0 and the SS/PBCH block. Or, the narrowband UE may determine the lowest PRB of the narrowband initial active downlink BWP based on the offset between the narrowband initial active downlink BWP and the SS/PBCH block. The narrowband UE may determine the lowest PRB of the narrowband CORESET0 based on the offset between the lowest PRB of the narrowband CORESET0 and the lowest PRB of the CORESET0 or the lowest PRB of the SS/PBCH block. Or, the narrowband UE may determine the lowest PRB of the narrowband initial active downlink BWP based on the offset between the lowest PRB of the narrowband initial active downlink BWP and the lowest PRB of the CORESET0 or the lowest PRB of the SS/PBCH block.

Further, if the narrowband UE is located in a Frequency Range 1 (FR1), a base station may place the offset in a PBCH, and the offset is carried in the SS/PBCH block index in the PBCH. For the FR1, the SS/PBCH block index in the PBCH is a reserved bit which is not used for indicating the SS/PBCH block index.

As a variant embodiment, if the narrowband UE is located in a Frequency Range 2 (FR2), a base station may place the offset in a PBCH, and the offset is carried in a monitoring occasion indication of a Type0-PDCCH. In a specific implementation, when a multiplexing pattern of a SS/PBCH block and a CORESET is 2 or 3, the Type0-PDCCH monitoring occasion indication may be equivalent to a Type0-PDCCH monitoring occasion table in meaning, because in this case, there are 3 bits in the Type0-PDCCH monitoring occasion reserved and can be used to indicate the offset.

As another variant embodiment, when a multiplexing pattern of the SS/PBCH block and the CORESET is 2, the offset is carried in a monitoring occasion indication of Type0-PDCCH.

As another variant embodiment, when a multiplexing pattern of the SS/PBCH block and the CORESET is 3, the offset is carried in a monitoring occasion indication of Type0-PDCCH.

In another embodiment, the narrowband UE may reuse a PSS and SSS of the Release 15, and use a narrowband PBCH different from the PBCH in the existing technology, and the narrowband PBCH refers to a PBCH used by the narrowband UE, generally speaking, a bandwidth of the narrowband PBCH is less than or equal to a bandwidth of the PBCH. In this case, the narrowband UE may receive the PBCH firstly, and the PBCH may indicate the narrowband UE to receive the narrowband PBCH. When the narrowband PBCH is indicated in the PBCH, the narrowband UE may receive the narrowband PBCH and determine the frequency domain position of the narrowband initial active downlink BWP.

When the narrowband UE reuses a PSS and SSS of the Release 15, and uses a narrowband PBCH, the bandwidth of the narrowband PBCH may be set as a preset value, and the preset value is associated with a band accessed by the narrowband UE. When the narrowband UE reuses the PSS and SSS of the Release 15, and uses the narrowband PBCH, an offset between the lowest PRB of the narrowband PBCH and the lowest PRB of the SS/PBCH block may be set as a preset value and the preset value is associated with a band accessed by the narrowband UE. In a specific implementation, a bandwidth of the offset is greater than or equal to a bandwidth of the narrowband PBCH. Or, a number of PRBs included in the offset is greater than or equal to a number of PRBs included in the narrowband PBCH.

In another embodiment, the narrowband UE may adopt a new narrowband PSS, a new narrowband SSS and a new narrowband PBCH. In a specific implementation, the narrowband UE can blindly detect the narrowband PSS and the narrowband SSS to obtain the time-frequency position of the narrowband PBCH. Afterwards, the narrowband UE receives the narrowband PBCH to obtain the narrowband PBCH information. Generally speaking, the bandwidth of the narrowband PSS is less than or equal to the bandwidth of the PSS, and the bandwidth of the narrowband SSS is less than or equal to the bandwidth of the SSS. The narrowband PBCH information may include: an offset between the lowest PRB of the narrowband CORESET0 and/or the lowest PRB of the narrowband initial active downlink BWP and the lowest PRB of the SS/PBCH block. Further, the narrowband UE may obtain the frequency domain position of the narrowband CORESET0 and/or the lowest PRB of the narrowband initial active downlink BWP, and obtain the frequency domain resource of the narrowband initial active downlink BWP.

After that, the narrowband UE may perform S102, that is, the narrowband UE receives a CORESET0 and/or the narrowband initial active downlink BWP at the frequency domain position, and/or receives the narrowband SIB1.

When a bandwidth supported by the narrowband UE is less than a maximum bandwidth of a CORESET0 or a PDSCH carrying a SIB1, the narrowband UE may obtain the narrowband CORESET0 and the narrowband initial active downlink BWP according to the following specific embodiments.

Embodiment one: the narrowband UE reuses a SS/PBCH block of the Release 15.

For a bandwidth of the narrowband CORESET0 and the narrowband initial active downlink BWP, by default, the narrowband UE assumes that the bandwidth of the narrowband CORESET0 and the narrowband initial active downlink BWP has a preset association relationship with the bandwidth to be accessed. For the frequency domain position of the narrowband CORESET0 and/or the narrowband initial active downlink BWP, the narrowband UE may adopt following solutions:

Example 1: By default, the lowest PRB of the narrowband CORESET0 and/or the narrowband initial active downlink BWP is determined as the lowest PRB of the CORESET0. This example is suitable when there are many time-frequency resources of the CORESET0 and more time-frequency resources of the PDSCH carrying the SIB1, because a part of resources of the CORESET0 may be occupied by Type0-PDCCH of narrowband CORESET0 in this case, and a part of resources of the PDSCH carrying the SIB1 may be occupied by the narrowband initial active downlink BWP.

Example 2: By default, the offset between the lowest PRB of the narrowband CORESET0 and the lowest PRB of the CORESET0 or a SS/PBCH block is a preset value. The bandwidth corresponding to the offset is greater than or equal to the bandwidth of the narrowband CORESET0 and/or the bandwidth of the narrowband initial active downlink BWP. That is, a number of PRBs in a certain subcarrier spacing corresponding to the bandwidth of the offset is greater than or equal to a number of PRBs in a certain subcarrier spacing corresponding to the narrowband CORESET0 and/or a number of PRBs in a certain subcarrier spacing corresponding to the narrowband initial active downlink BWP. This example is suitable for the situation where there are less time-frequency resources of the CORESET0 and there are less time-frequency resources of the PDSCH carrying the SIB1.

Example 3: the narrowband UE may obtain the position of the narrowband CORESET0 by obtaining an offset between the SS/PBCH block or the CORESET0 and the narrowband CORESET0. More specifically, the narrowband UE may obtain the position of the lowest PRB of the narrowband CORESET0 by obtaining the offset between the lowest PRB of the SS/PBCH block or the lowest PRB of the CORESET0 and the lowest PRB of the narrowband CORESET0. Because the SS/PBCH block of the Release 15 is reused, the offset can be transmitted through reserved bits or reserved codepoints within the SS/PBCH block.

For the FR1, the narrowband UE may obtain the offset by obtaining the SS/PBCH block index in the PBCH (that is, the upper 3 numbers of bits of SS/PBCH block time index, 3 MSB). For the FR2, the narrowband UE may obtain the offset by obtaining reserved bits or reserved codepoints of the monitoring occasion indication of the Type0-PDCCH (4 numbers of bits, define by a table) in the PBCH. In an example, when the multiplexing pattern of the SS/PBCH block and a CORESET is 2 in the FR2, the monitoring occasion indication of Type0-PDCCH indicates the offset. In another example, when the multiplexing pattern of the SS/PBCH block and a CORESET is 3 in the FR2, the monitoring occasion indication of Type0-PDCCH indicates the offset.

Embodiment two: the narrowband UE reuses a PSS/SSS of Release 15, and uses a narrowband PBCH.

By default, the bandwidth of the narrowband PBCH is a preset value, and the preset value is associated with the band. By default, the offset between the lowest PRB of the narrowband PBCH and the lowest PRB of the SS/PBCH block may be set as a preset value. That is, the number of PRBs in a certain subcarrier spacing corresponding to the offset is greater than or equal to the number of PRBs in a certain subcarrier spacing corresponding to the bandwidth of the narrowband PBCH. The UE may obtain a bandwidth and a frequency domain position of the narrowband CORESET0 and a frequency domain position of the narrowband initial active downlink BWP by obtaining the narrowband PBCH indication. Specifically, the narrowband UE may obtain the frequency domain position of the narrowband CORESET0 and/or of the narrowband initial active downlink BWP by obtaining the offset between the lowest PRB of the SS/PBCH block indicated by the narrowband PBCH and the lowest PRB of the narrowband CORESET0 and/or of the narrowband initial active downlink BWP.

Embodiment three: whether the narrowband UE completely reuses the SS/PBCH block of Release 15 is indicated by the PBCH.

The narrowband UE may receive the PBCH, and obtain whether the narrowband UE completely reuses the SS/PBCH block of the Release 15 based on the PBCH information (such as, MIB). In a specific implementation, when the bandwidth supported by the narrowband UE is greater than or equal to the maximum bandwidth of CORESET0 or the maximum bandwidth of the PDSCH carrying the SIB1, the narrowband UE may obtain the narrowband CORESET0 and the PDSCH carrying the narrowband SIB1 by receiving CORESET0 or the PDSCH carrying SIB1.

Embodiment four: the narrowband UE may receive the Type0-PDCCH in the CORESET0, and obtain a scheduling information of a PDSCH carrying SIB based on the Type0-PDCCH. After that, the narrowband UE may receive the PDSCH carrying SIB and obtain the SIB (message or information) based on the scheduling information. The SIB may include the information of the narrowband CORESET0 and/or the narrowband initial active downlink BWP. For example, the SIB may include a narrowband SIB and a SIB. And the narrowband SIB may include the information of the narrowband CORESET0 and/or the narrowband initial active downlink BWP. The advantage of this solution is that the narrowband UE may receive both the SIB1 and the narrowband SIB1, and some information in the SIB1 is useful to the narrowband UE, such as a cell-level information, and the narrowband UE can obtain these useful SIB.

Embodiment five: narrowband UE may receive a Type0B-PDCCH in the CORESET0, wherein the Type0B-PDCCH is a PDCCH used for scheduling a PDSCH carrying the narrowband SIB1. After that, the narrowband UE may receive a scheduling information of a PDSCH carrying SIB based on the Type0B-PDCCH. The narrowband UE may receive PDSCH carrying the narrowband SIB1 and obtain the narrowband SIB1. And the bandwidth of the narrowband SIB1 is less than or equal to the bandwidth of the SIB1. The narrowband UE may also receive a Type0A-PDCCH in the CORESET0, wherein the Type0A-PDCCH is a PDCCH used for scheduling a PDSCH carrying the OSI. After that, the narrowband UE may obtain the scheduling information of a PDSCH carrying OSI based on the Type0A-PDCCH. The narrowband UE may receive the PDSCH carrying OSI, and obtain the OSI, wherein the OSI may contain the narrowband SIB1. The advantage of this solution is that the narrowband UE may selectively receive SIB1 or narrowband SIB1, which saves an energy consumption of the terminal. In practical applications, the narrowband UE may select the SIB1 or narrowband SIB1 that needs to be received currently according to the instruction of the base station or different scenarios. Specifically, the UE may obtain an information in paging, if the information indicates a System information update, the UE may receive the SIB1, and if the information indicates a narrowband system update, the UE may receive the narrowband SIB1.

Embodiment six: in a specific implementation, bits in the PBCH may be used to indicate whether the Type0-PDCCH schedules the PDSCH carrying the narrowband SIB1, for example, one bit in the PBCH information may be used to indicate whether there is a narrowband PBCH.

In a specific implementation, the PBCH may indicate an offset between the SS/PBCH block and CORESET0, and the narrowband UE may determine whether there is a narrowband PBCH by the comparison result between the offset and a threshold. If the offset is less than or equal to a certain threshold, it can indicate that a narrowband PBCH exists, and the frequency domain position of the narrowband CORESET0 and/or the frequency domain position of the narrowband initial active downlink BWP can be determined according to the solution provided in the embodiment two. Otherwise, if the offset is greater than the threshold, the frequency domain position of the narrowband CORESET0 and/or the frequency domain position of the narrowband initial active downlink BWP may be determined according to Embodiment one.

Those skilled in the art understand that when the offset is zero or positive, the number of the lowest PRB of the SS/PBCH block in the Common Resource Block is higher than the number of the lowest PRB of CORESET0 in the Common Resource Block. The benefit of this is that if the offset is less than or equal to a certain threshold, the SS/PBCH block is almost aligned with the bottom end of the frequency domain resources of CORESET0, so that the base station may start to allocate the frequency domain resource allocation to the PDSCH carrying SIB1 (including narrowband SIB1) can start from the top of the highest PRB of the SS/PBCH block, and continuously allocate PRBs. Otherwise, there is a certain frequency domain spacing between the SS/PBCH block and the bottom of the frequency domain resources of CORESET0, Therefore that the frequency domain resource allocation of the base station to the PDSCH carrying SIB1 (including narrowband SIB1) can start from the top of the highest PRB of the SS/PBCH block, and continuously allocate PRBs, and a frequency domain resource allocation of the narrowband initial active downlink BWP, which the base station can start from the lowest PRB of the CORESET0 sequentially, and continuously allocate PRBs, which can realize a full utilization of resources.

From the above, the embodiments of the present disclosure provide a feasible solution for determining the access resource of the narrowband UE, and then obtaining and configuring the maximum bandwidth of the frequency domain resources of the narrowband CORESET0 and the maximum bandwidth of the frequency domain resources of the PDSCH carrying the SIB1, and the maximum bandwidth of the frequency domain resources of the narrowband initial active downlink BWP.

FIG. 2 schematically illustrates a structural diagram of a device for determining an access resource according to an embodiment of the present disclosure. The device 2 for determining an access resource (hereinafter referred to as the determining device 2 may be configured to implement process shown in FIG. 1, which is executed by the UE.

Specifically, determining device 2 may include: a determining circuitry 21 which is adapted to determine a frequency domain position of a narrowband CORESET0 and/or a frequency domain position of a narrowband initial active downlink BWP; and/or, determine a narrowband SIB1.

In some embodiment, the lowest PRB of the narrowband CORESET0 and/or a lowest PRB of the narrowband initial active downlink BWP is equal to the lowest PRB of the CORESET0.

In some embodiment, the bandwidth of the narrowband CORESET0 and/or a bandwidth of the narrowband initial active downlink BWP is a preset value.

In some embodiment, a lowest PRB of the narrowband CORESET0 is equal to a lowest PRB of the CORESET0; and/or, a lowest PRB of the narrowband initial active downlink BWP is equal to the lowest PRB of the CORESET0.

In some embodiment, an offset between a lowest PRB of the narrowband CORESET0 and a lowest PRB of a CORESET0 or a lowest PRB of the SS/PBCH block is a preset value; and/or, an offset between the lowest PRB of the narrowband initial active downlink BWP and the lowest PRB of the CORESET0 is a preset value.

In some embodiment, a bandwidth of the offset is greater than or equal to a bandwidth of the narrowband CORESET0; and/or, the bandwidth of the offset is greater than or equal to a bandwidth of the narrowband initial active downlink BWP.

In some embodiment, a number of PRBs included in the offset is greater than or equal to a number of PRBs included in the narrowband CORESET0; and/or, the number of PRBs included in the offset is greater than or equal to number of PRBs included in the narrowband initial active downlink BWP.

In some embodiment, the determining device 2 may also include: an obtaining circuitry 22 which is adapted to obtain an offset between the narrowband CORESET0 and a CORESET0 or a SS/PBCH block; and/or, obtain an offset between the narrowband initial active downlink BWP and the SS/PBCH block.

In some embodiment, the determining circuitry 21 may include: a first determining sub-circuitry 211 which is adapted to determine a lowest PRB of the narrowband CORESET0 based on the offset; and/or, determining a lowest PRB of the initial active downlink BWP based on the offset.

In some embodiment, if the frequency domain position is within the FR1, the offset is carried in a SS/PBCH block index in a PBCH.

In some embodiment, if the frequency domain position is within the FR2, the offset is carried in a monitoring occasion indication of a Type0-PDCCH.

In some embodiment, if a multiplexing pattern of the SS/PBCH block and a CORESET is 2, the offset is carried in a monitoring occasion indication of a Type0-PDCCH.

In some embodiment, if a multiplexing pattern of the SS/PBCH block and a CORESET is 3, the offset is carried in a monitoring occasion indication of a Type0-PDCCH.

In some embodiment, the determining circuitry 21 is adapted to receive a narrowband PBCH to obtain a narrowband PBCH information; and obtain the narrowband CORESET0 and/or the narrowband initial active downlink BWP based on the narrowband PBCH information.

In some embodiment, an offset between a lowest PRB of the narrowband PBCH and a lowest PRB of a SS/PBCH block is a preset value.

In some embodiment, a bandwidth of the offset is greater than or equal to a bandwidth of the narrowband PBCH.

In some embodiment, a number of PRBs included in the offset is greater than or equal to a number of PRBs included in the narrowband PBCH.

In some embodiment, the determining circuitry 21 may include: a first receiving sub-circuitry 212 which is adapted to receive Type0-PDCCH in the CORESET0 for obtaining a scheduling information of a PDSCH based on the Type0-PDCCH; and a second receiving sub-circuitry 213 which is adapted to receive the PDSCH based on the scheduling information for obtaining the narrowband SIB1.

In some embodiment, the determining circuitry 21 may include: a third receiving sub-circuitry 214 which is adapted to receive a Type0-PDCCH for obtaining a scheduling information of a PDSCH based on the Type0-PDCCH if bits in a PBCH indicate that the Type0-PDCCH schedules a PDSCH carrying the narrowband SIB1, or if an offset between a SS/PBCH block indicated in the PBCH and the CORESET0 is less than or equal to the preset threshold; and a fourth receiving sub-circuitry 215 which is adapted to receive the PDSCH based on the scheduling information for obtaining the narrowband SIB1.

In some embodiment, the determining circuitry 21 is also adapted to receive a Type0B-PDCCH in the CORESET0, the Type0B-PDCCH is a PDCCH used for scheduling a PDSCH carrying the narrowband SIB1; obtain a scheduling information of the PDSCH carrying the narrowband SIB1 based on the Type0B-PDCCH; and receive the PDSCH based on the scheduling information for obtaining the narrowband SIB1.

In some embodiment, if bits in a PBCH indicate that a Type0-PDCCH schedules a PDSCH carrying the narrowband SIB1, or an offset between a SS/PBCH block indicated in the PBCH and the CORESET0 is less than or equal to the preset threshold, the determining circuitry 21 is also adapted to receive the Type0B-PDCCH, wherein the Type0B-PDCCH is a PDCCH used for scheduling a PDSCH carrying the narrowband SIB1; obtain a scheduling information of the PDSCH carrying the narrowband SIB1 based on the Type0B-PDCCH; and receive the PDSCH based on the scheduling information for obtaining the narrowband SIB1.

In some embodiment, the determining device 2 may also include: a receiving circuitry 23 which is adapted to receive the CORESET0 and/or the narrowband initial active downlink BWP at the frequency domain position; and/or, receive the SIB1.

In some embodiment, the determining circuitry 21 is also adapted to receive a Type0A-PDCCH, wherein the Type0A-PDCCH is a PDCCH used for scheduling a PDSCH carrying an OSI; obtain a scheduling information of the PDSCH carrying the OSI based on the Type0A-PDCCH; and receive the PDSCH based on the scheduling information for obtaining the OSI, wherein the OSI includes the narrowband SIB1.

For the principle, specific embodiments, and beneficial effects of the device for determining an access resource, please refer to the foregoing and the related description of the method shown in FIG. 1, which will not be repeated here.

In an embodiment of the present disclosure, a storage medium having computer instructions stored therein is provided, wherein once the computer instructions are executed, the method shown in FIG. 1 can be performed. The storage medium includes a computer-readable storage medium, such as a non-volatile or non-transitory memory, the storage medium may also include an optical disk, a mechanical hard disk and a solid-state hard disk or the like.

In an embodiment of the present disclosure, a terminal including a memory and a processor is provided, wherein the memory has computer instructions stored therein, and the method shown in FIG. 1 can be performed, once the processor executes the computer instructions.

Specifically, a terminal in the embodiments of the present disclosure may refer to various forms of user equipment (UE), access terminals, user units, user stations, mobile stations (MS), remote stations, remote terminals, mobile devices, user terminals, terminal equipment, wireless communication devices, user agents or user devices. The terminal device may also be a cellular phone, a cordless phone, a Session Initiation Protocol (SIP) phone, a Wireless Local Loop (WLL) station, a Personal Digital Assistant (PDA), a handheld device with the wireless communication function, a computing device or other processing devices connected with a wireless modem, vehicle equipments, wearable devices, terminal devices in the future 5G network, terminal devices in the future Public Land Mobile Network (PLMN), and the like, which is not limited in embodiments of the present disclosure.

Specifically, in embodiments of the present disclosure, the processor may be central processing units (CPU), or other general processors, digital signal processors (DSP), application specific integrated circuits (ASIC), field programmable gate arrays (FPGA) or other programmable logic devices, discrete gates or transistor logic devices, discrete hardware components, and the like. A general processor may be a microprocessor or the processor may be any conventional processor or the like.

Furthermore, the memory in the embodiments of the present disclosure may be either volatile memory or non-volatile memory, or may include both volatile and nonvolatile memories. The non-volatile memory may be a read-only memory (ROM), a programmable ROM (PROM), an erasable PROM (EPROM), an electrically EPROM (EEPROM), or a flash memory. The volatile memory may be a random access memory (RAM) which functions as an external cache. By way of example but not limitation, various forms of RAM are available, such as a static RAM (SRAM), a dynamic random access memory (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM).

It can be understood that, in various embodiments of the present disclosure, the sequence numbers of each process as shown in the accompanying drawings do not limit an execution order, and the execution sequence of each process should be determined by its function and internal logic, and should not constitute any limitation on the implementation process of the embodiments of the present disclosure.

In the several embodiments of the present disclosure, it should be understood that the disclosed method, device and system may be implemented in other manners. For example, the embodiments of the device described above are only illustrative. For example, the division of the units is only a logical function division. In actual implementation, there may be other division methods. For example, a plurality of units or components may be combined or may be integrated into another system, or some features may be ignored, or not implemented. On the other hand, the shown or discussed mutual coupling or direct coupling or communication connection may be through some interfaces, indirect coupling or communication connection of devices or units, and may be in electrical, mechanical or other forms.

Although the present disclosure is disclosed as above, the present disclosure is not limited to this. Those skilled in the art can make various changes and modifications without departing from the spirit and scope of the present disclosure.

Therefore, the protection scope of the present disclosure should be subject to the scope defined by the claims.

What is claimed is:

1. A method for determining an access resource, comprising:
    determining, by a processor, a frequency domain position of a narrowband initial active downlink Bandwidth Part (BWP);
    wherein said determining, by the processor, the frequency domain position of the narrowband initial active downlink BWP comprises:
        receiving from a base station, by the processor, a Type0-Physical Downlink Control Channel (PDCCH) for obtaining a scheduling information of a Physical Downlink Shared Channel (PDSCH) based on the Type0-PDCCH; and
        receiving from the base station, by the processor, the PDSCH based on the scheduling information for obtaining System Information Block (SIB) information which comprises information of the narrowband initial active downlink BWP.

2. The method according to claim 1, wherein a bandwidth of the narrowband initial active downlink BWP is a preset value.

3. The method according to claim 1, wherein a lowest Physical Resource Block (PRB) of the narrowband initial active downlink BWP is equal to a lowest PRB of a Control Resource SET0 (CORESET0).

4. The method according to claim 1, wherein an offset between a lowest PRB of the narrowband initial active downlink BWP and a lowest PRB of a CORESET0 is a preset value.

5. The method according to claim 4, wherein a bandwidth of the offset is greater than or equal to a bandwidth of the narrowband initial active downlink BWP.

6. The method according to claim 4, wherein number of PRBs comprised in the offset is greater than or equal to a number of PRBs comprised in the narrowband initial active downlink BWP.

7. The method according to claim 1, further comprising: obtaining an offset between the narrowband initial active downlink BWP and a Synchronization Signal and Physical Broadcast Channel Block (SS/PBCH block).

8. The method according to claim 7, wherein said determining, by the processor, the frequency domain position of the narrowband initial active downlink BWP comprises:
    determining, by the processor, a lowest PRB of the narrowband initial active downlink BWP based on the offset.

9. The method according to claim 7, wherein the offset is carried in a monitoring occasion indication of the Type0-PDCCH in response to a multiplexing pattern of the SS/PBCH block and a CORESET being 2.

10. The method according to claim 7, wherein the offset is carried in a monitoring occasion indication of the Type0-PDCCH in response to a multiplexing pattern of the SS/PBCH block and a CORESET being 3.

11. A device for determining an access resource, comprising:
    a determining circuitry, adapted to determine a frequency domain position of a narrowband initial active downlink Bandwidth Part (BWP);
    wherein said determining the frequency domain position of the narrowband initial active downlink BWP comprises:
        receiving from a base station a Type0-Physical Downlink Control Channel (PDCCH) for obtaining a scheduling information of a Physical Downlink Shared Channel (PDSCH) based on the Type0-PDCCH; and
        receiving from the base station the PDSCH based on the scheduling information for obtaining System Information Block (SIB) information which comprises information of the narrowband initial active downlink BWP.

12. A non-transitory storage medium storing one or more programs, the one or more programs comprising computer instructions, which, when executed by a processor, cause the processor to:
    determine a frequency domain position of a narrowband initial active downlink Bandwidth Part (BWP);
    wherein said determining the frequency domain position of the narrowband initial active downlink BWP comprises:
        receiving from a base station a Type0-Physical Downlink Control Channel (PDCCH) for obtaining a scheduling information of a Physical Downlink Shared Channel (PDSCH) based on the Type0-PDCCH; and
        receiving from the base station the PDSCH based on the scheduling information for obtaining System Information Block (SIB) information which comprises information of the narrowband initial active downlink BWP.

* * * * *